(12) United States Patent
Kretzschmar

(10) Patent No.: US 10,150,566 B2
(45) Date of Patent: Dec. 11, 2018

(54) CORE OF TRAY TABLE ASSEMBLY

(71) Applicant: Zodiac Seats US LLC, Gainesville, TX (US)

(72) Inventor: Edwin N. Kretzschmar, Cedar Park, TX (US)

(73) Assignee: Zodiac Seats US LLC, Gainesville, TX (US)

( * ) Notice: Subject to any disclaimer, the term of this patent is extended or adjusted under 35 U.S.C. 154(b) by 0 days.

(21) Appl. No.: 15/740,075

(22) PCT Filed: Feb. 2, 2016

(86) PCT No.: PCT/US2016/016118
§ 371 (c)(1),
(2) Date: Dec. 27, 2017

(87) PCT Pub. No.: WO2017/003521
PCT Pub. Date: Jan. 5, 2017

(65) Prior Publication Data
US 2018/0186458 A1    Jul. 5, 2018

Related U.S. Application Data

(60) Provisional application No. 62/186,187, filed on Jun. 29, 2015.

(51) Int. Cl.
*B64D 11/06* (2006.01)
*B60N 3/00* (2006.01)

(52) U.S. Cl.
CPC .......... *B64D 11/0638* (2014.12); *B60N 3/004* (2013.01)

(58) Field of Classification Search
CPC ................ B64D 11/0638; B60N 3/004
USPC .......... 108/44, 45, 152, 57.25, 51.3; 297/146
See application file for complete search history.

(56) References Cited

U.S. PATENT DOCUMENTS

| | | | | |
|---|---|---|---|---|
| 3,580,190 A | * | 5/1971 | Fowler | B65D 19/0012 108/57.25 |
| 4,159,071 A | * | 6/1979 | Roca | A47C 7/70 108/42 |
| 5,547,247 A | * | 8/1996 | Dixon | A47C 7/70 297/145 |

(Continued)

OTHER PUBLICATIONS

International Patent Application No. PCT/US2016/016118, Search Report and Written Opinion, dated Apr. 19, 2016.

*Primary Examiner* — Jose V Chen
(74) *Attorney, Agent, or Firm* — Kilpatrick Townsend & Stockton LLP

(57) ABSTRACT

Described are assemblies that include elements for forming at least a part of a core (140) or other interior portion of a tray table (112), such as for an aircraft or other passenger craft. The core (140) of the tray table can include multiple frames (142A, 142B, 142C) that can be connected together via engagement features (158A, 158B, 158C) in different configurations or modes to provide different widths of the core (140). Additionally or alternatively, the table body (114) may be provided with a slider assembly (156, 256) including a shaft (122) slidably received between one or more pairs of projections (244) that extend from a base (230) and curve inwardly to face one another. In some instances, the base (230) or another feature of the slider assembly (156, 256) may be integrally formed into a frame of the core (140) of the tray table (112).

20 Claims, 8 Drawing Sheets

(56) References Cited

U.S. PATENT DOCUMENTS

| | | | | |
|---|---|---|---|---|
| 5,876,092 A * | 3/1999 | An | ......................... | B60N 3/004 297/146 |
| 6,761,398 B2 * | 7/2004 | Bentley | ................... | B60N 2/22 297/146 |
| 7,306,282 B2 * | 12/2007 | Salzer | ..................... | A47C 7/70 297/145 |
| 7,500,716 B2 * | 3/2009 | Guerin | .................. | B60N 3/004 297/146 |
| 7,506,923 B1 | 3/2009 | Gauss | | |
| 8,777,310 B2 * | 7/2014 | Westerink | .............. | B60N 3/004 297/217.3 |
| 8,905,470 B2 * | 12/2014 | Shih | ....................... | B60N 3/004 297/146 |
| 8,934,063 B2 * | 1/2015 | Boyer, Jr. | .............. | H04N 5/655 297/144 |
| 8,936,308 B2 * | 1/2015 | Petersen | ............ | B64D 11/0638 297/146 |
| 9,180,805 B2 * | 11/2015 | Millan | ................... | B60N 3/004 |
| 9,573,687 B2 * | 2/2017 | Stephens | ........... | B64D 11/0638 |
| 9,919,802 B2 * | 3/2018 | Stephens | ............ | B64D 11/0638 |
| 2002/0170470 A1 * | 11/2002 | Cheng | .................... | B60N 3/002 108/2 |
| 2003/0000430 A1 | 1/2003 | Sepe et al. | | |
| 2003/0193220 A1 * | 10/2003 | Jensen | ..................... | A47C 7/38 297/146 |
| 2006/0075934 A1 * | 4/2006 | Ram | ..................... | B60N 3/004 108/44 |
| 2009/0174234 A1 * | 7/2009 | Vignal | ................... | B60N 3/002 297/163 |
| 2014/0241650 A1 * | 8/2014 | Khankal | ............... | F16C 29/045 384/17 |
| 2014/0292042 A1 | 10/2014 | Stewart et al. | | |
| 2015/0068435 A1 * | 3/2015 | Maslakow | ......... | B64D 11/0638 108/42 |
| 2016/0129821 A1 * | 5/2016 | Hernandez | ............. | A47B 31/06 297/163 |
| 2016/0221677 A1 * | 8/2016 | Hance | ................ | B64D 11/0605 |
| 2016/0272326 A1 * | 9/2016 | Garing | ............... | B64D 11/0638 |
| 2017/0283067 A1 * | 10/2017 | Darbyshire | ........ | B64D 11/0638 |
| 2017/0355465 A1 * | 12/2017 | Trimble | ............ | B64D 11/0638 |

* cited by examiner

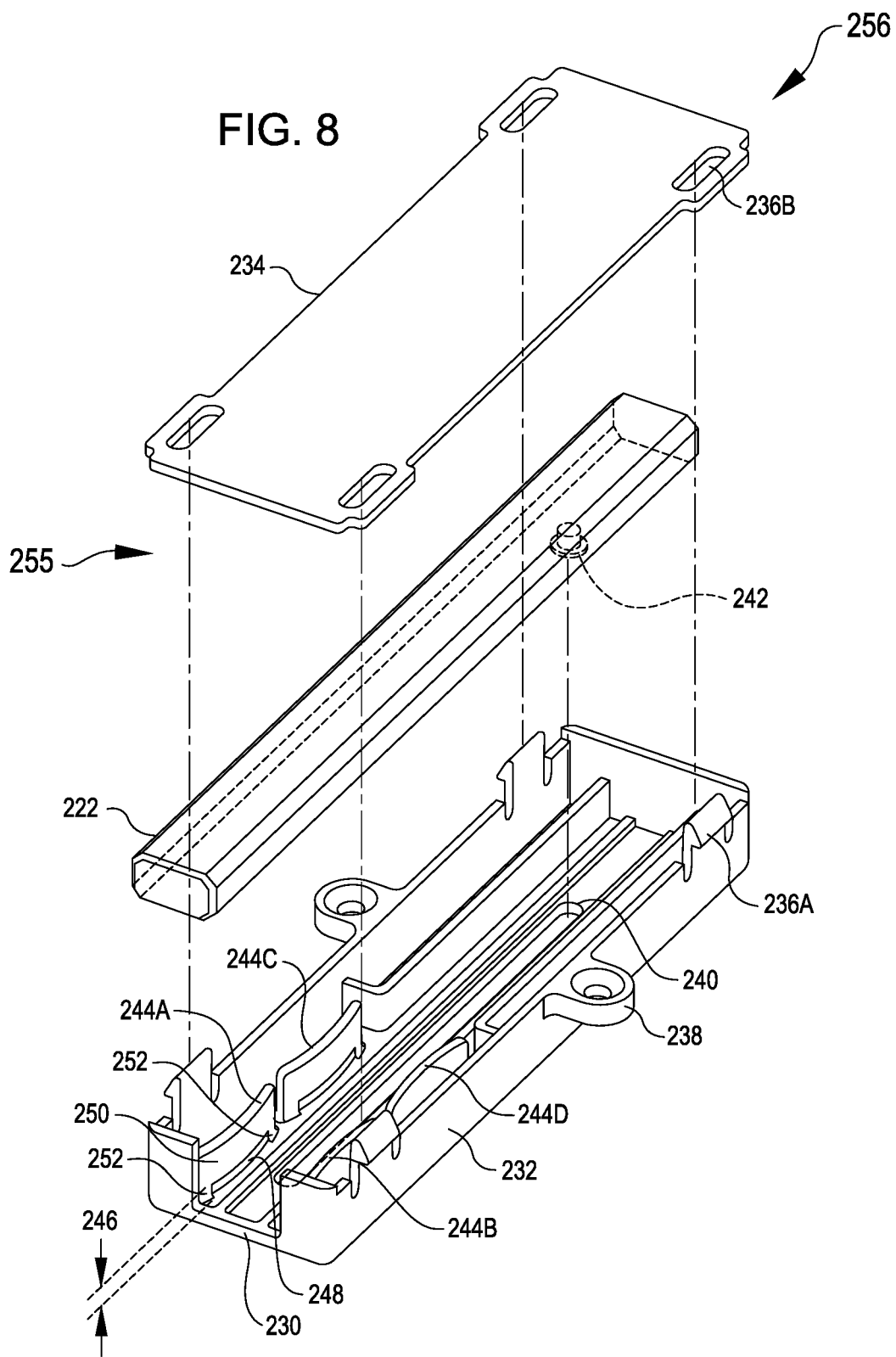

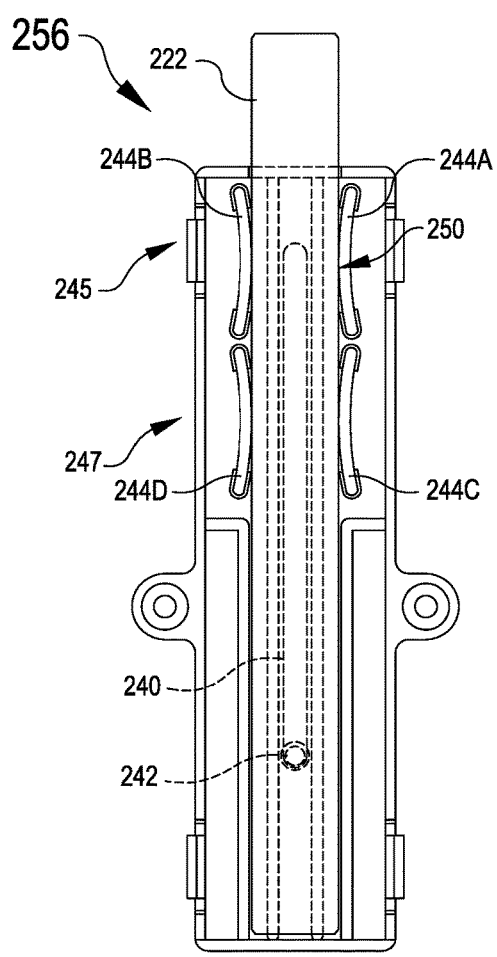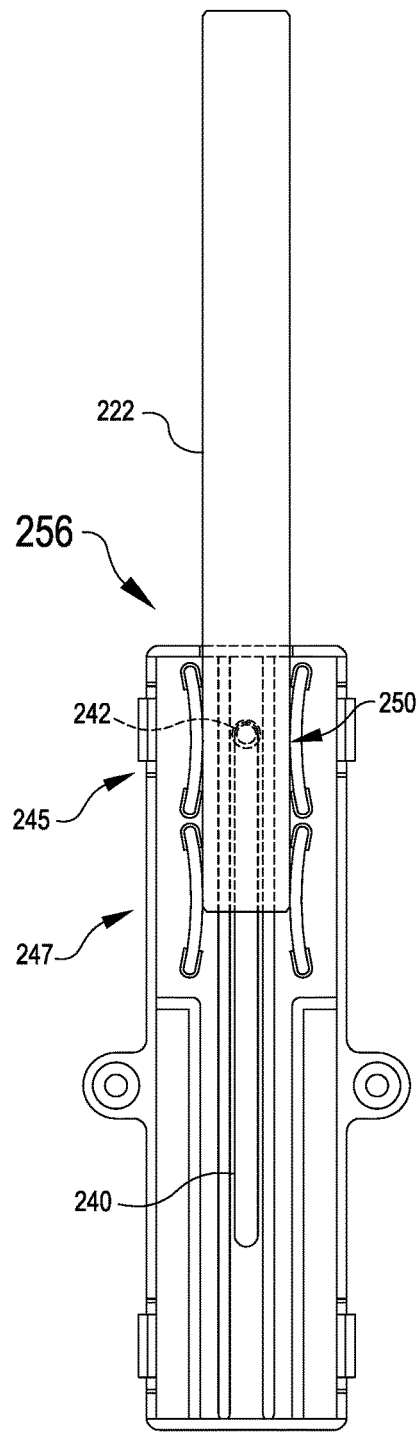

CORE OF TRAY TABLE ASSEMBLY

CROSS REFERENCE TO RELATED APPLICATIONS

This application is related to and claims priority benefits from U.S. Provisional Application Ser. No. 62/186,187, filed on Jun. 29, 2015, entitled INTEGRAL SLIDE MECHANISM FOR FOOD TRAYS/THREE PIECE ONE SIZE FITS ALL FOOD TRAY INNER CORE, which is hereby incorporated in its entirety by this reference.

FIELD OF THE INVENTION

The field of the invention relates to tray table assemblies for passenger vehicles such as aircrafts.

BACKGROUND

Tray tables are widely used in most aircraft seat assemblies. The tray table sub-assembly is typically pivoted on a pair of arms which allows the tray table to swivel between deployed and stowed positions, for example, relative to the back of the aircraft seat. This can provide a convenient table for a person sitting in a position facing the rear of the seat, such as a passenger situated aft of a forward-facing seat. When deployed, tray tables may be used as a surface for supporting food, drink, or other items, such as for work or entertainment during travel. The pivoting nature of the tray table may be useful in allowing the tray table to be readily deployed when desired by a seated passenger or readily stowed, such as to facilitate egress or ingress relative to the seat.

Different slider assemblies exist for movement of a tray table surface toward or away from a seat back. Such motion may allow the tray table to be moved closer or further away from a passenger, as desired. Typically, slider assemblies include components that permit the tray table surface to translate relative to the swiveling arms in at least the deployed position. In many slider assemblies, a large number of components (such as ball bearings, housings, shafts, springs, and others) are used to provide such functionality, resulting in additional costs and sources of weight that may be desirable to avoid, especially when multiplied across a large number of seats common aboard aircraft or other passenger craft.

Additionally, various sizes and styles of tray tables exist to accommodate different sizes and styles of passenger seats. This variety of sizes and styles can result in increased manufacturing costs due to different tools (such as molds or dies) being used to construct various different sub-components. Additionally, in many cases, a larger size of tray table corresponds to an increased amount of weight, which is desirably avoided.

SUMMARY

The terms "disclosure," "the disclosure," "this disclosure" and "the present disclosure" used in this patent are intended to refer broadly to all of the subject matter of this patent and the patent claims below. Statements containing these terms should be understood not to limit the subject matter described herein or to limit the meaning or scope of the patent claims below. Embodiments of the disclosure covered by this patent are defined by the claims below, not this summary. This summary is a high-level overview of various aspects of the disclosure and introduces some of the concepts that are further described in the Detailed Description section below. This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings and each claim.

According to certain embodiments of the present disclosure, assemblies (e.g., tray table assemblies) can include a first frame, a second frame, and a third frame. The first frame can define a central component of a core of a tray table and include a first set of engagement features integrally formed in the first frame. The second frame can define a leftward component of the core of the tray table and include a second set of engagement features integrally formed in the second frame. The third frame can define a rightward component of the core of the tray table and include a third set of engagement features integrally formed in the third frame. The first set of engagement features can be configured to engage the second set of engagement features and the third set of engagement features so that the first frame, the second frame, and the third frame connect together to form the core of the tray table. The first set of engagement features can also be configurable among multiple alternative modes of engagement with the second set of engagement features and the third set of engagement features so as to form multiple alternative widths of the core of the tray table. The second frame and the third frame can also each include a respective frame comprising a sliding assembly. The sliding assembly can include a base integrally formed in the respective frame, a pair of projections extending from the base and curved toward one another, and a shaft slidably received by the pair of projections so as to facilitate sliding of the core of the tray table relative to the shaft.

In some embodiments, the assembly may further include a shell corresponding to at least one of the multiple alternative widths of the core of the tray table and disposed about the core of the tray table. The assembly may additionally or alternatively include a seat comprising a seat back, wherein the sliding assembly facilitates sliding of the core of the tray table relative to the seat back. Additionally or alternatively, the core of the tray table may include a core of a first leaf of the tray table, and the assembly may include a second leaf of the tray table coupled with the first leaf of the tray table by one or more hinges.

According to certain embodiments, an assembly (e.g., a tray table assembly) can include a first frame defining a first component of a core of a tray table and including a first set of engagement features. The assembly can further include a second frame defining a second component of the core of the tray table and including a second set of engagement features. The first set of engagement features can be configured to engage the second set of engagement features so that at least the first frame and the second frame connect together to form the core of the tray table. The first set of engagement features can also be configurable among multiple alternative modes of engagement with the second set of engagement features so as to form multiple alternative widths of the core of the tray table.

In some embodiments, the assembly can also include a third frame defining a third component of the core of the tray table and include a third set of engagement features. The first set of engagement features may be further configured to engage the third set of engagement features so that at least the first frame, the second frame, and the third frame connect together to form the core of the tray table. The first set of engagement features may also be configurable among multiple alternative modes of engagement with the third set of engagement features so as to form multiple alternative widths of the core of the tray table.

In some embodiments, the first set of engagement features is configurable among at least three alternative modes of engagement so as to form at least three alternative widths of the core of the tray table.

In some embodiments, the tray table includes a first leaf and a second leaf. The second leaf may be disposed between the first leaf and a back of a passenger seat when the table is the stowed position. The core of the tray table may disposed in the first leaf. Additionally or alternatively, the core of the tray table may disposed in the second leaf.

In some embodiments, at least one of the first set of engagement features or the second set of engagement features includes a clasp configured to engage a brace of the other of the at least one of the first set of engagement features or the second set of engagement features. Additionally or alternatively, at least one of the first set of engagement features or the second set of engagement features may include a notch configured to engage a brace of the other of the at least one of the first set of engagement features or the second set of engagement features.

In some embodiments, the assembly including at least the first frame and the second frame further includes a sliding assembly that includes a base integrally formed in the first frame, a pair of projections extending from the base and curved toward one another, and a shaft slidably received by the pair of projections so as to facilitate sliding of the core of the tray table relative to the shaft.

According to certain embodiments, an assembly (e.g., a tray table assembly) can include a base, a par of projections, and a shaft. The base may be configured to be coupled with a body of a tray table. The a pair of projections may extend from the base and be curved toward one another. The shaft may be slidably received by the pair of projections so as to facilitate sliding of the body of the tray table relative to the shaft.

In some embodiments, the pair of projections may include a first pair of projections, and the assembly may further include a second pair of projections curved toward one another. The shaft may be slidably received by bearing surfaces of the first pair and the second pair of projections so as to facilitate sliding of the base relative to the shaft.

In some embodiments, an inner surface of a projection of the pair of projections nearest the other projection of the pair of projections is positioned with a gap between the inner surface and the base so as to permit flexure of the inner surface of the projection for engaging the shaft independent of deformation of the base.

In some embodiments, the assembly further includes a slot and a stopper. The slot may be disposed through the base and between the pair of projections. The stopper may be coupled with the shaft and extend into the slot so as to constrain the shaft from moving beyond a predetermined amount defined by the slot.

In some embodiments, the base may be coupled with the body of the tray table by being integrally formed in a component of a core of the tray table.

In some embodiments, the base may be configured to be coupled with the body of the tray table by receiving at least one fastener for coupling the base with the body of the tray table.

In some embodiments, the assembly further includes a housing that includes the base and sidewalls extending from the base. The assembly may further include a lid configured to be received along the sidewalls so as to enclose at least one the pair of projections or the shaft within the housing.

BRIEF DESCRIPTION OF THE DRAWINGS

FIG. 8 is an exploded assembly view of a slider assembly that may be incorporated into the components of the core of the tray table assembly of the seat of FIGS. 1-7.

FIG. 9 is a top view of the slider assembly of FIG. 8, showing the slider assembly in a retracted position.

FIG. 10 is a top view of the slider assembly of FIGS. 8-9, showing the slider assembly in an extended position.

DETAILED DESCRIPTION

Figure 1:
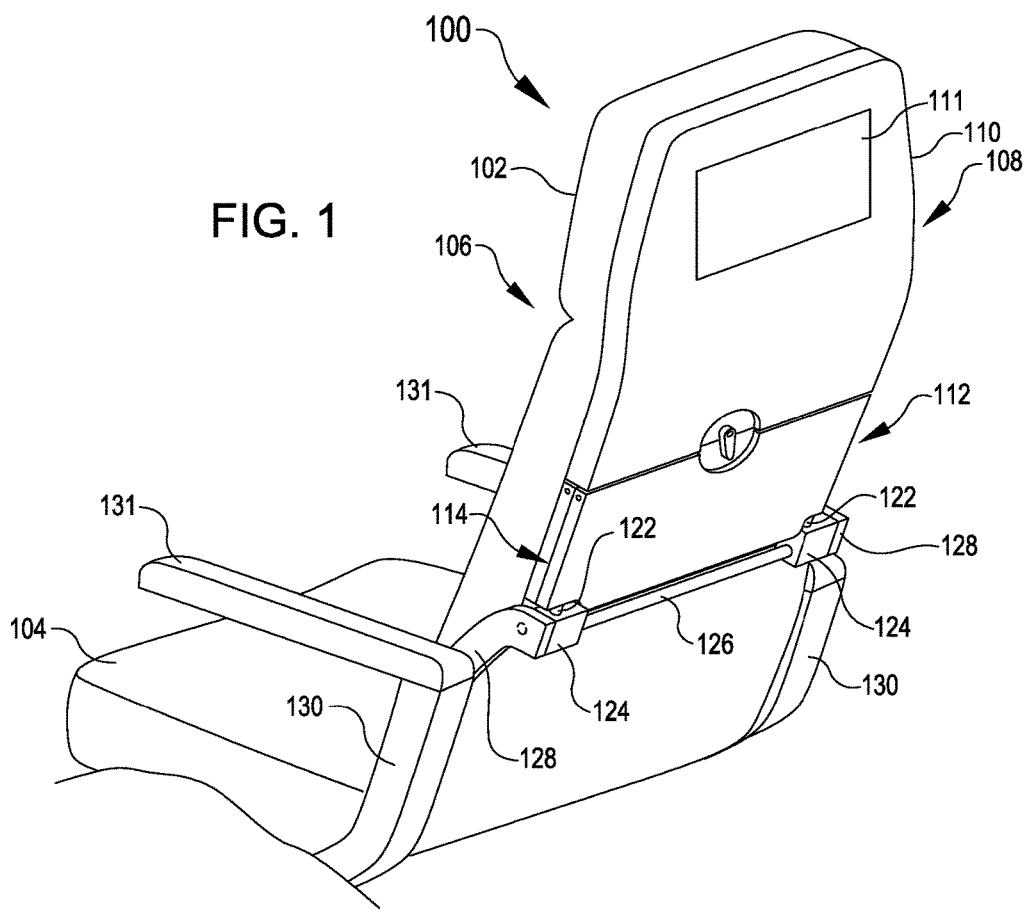
FIG. 1 is a perspective rear view of seat with a tray table in a stowed configuration, according to certain embodiments of the present disclosure.

The subject matter of embodiments of the present disclosure is described here with specificity to meet statutory requirements, but this description is not intended to limit the scope of the claims. The claimed subject matter may be embodied in other ways, may include different elements or steps, and may be used in conjunction with other existing or future technologies. This description should not be interpreted as implying requirement of any particular order or arrangement among or between various steps or elements except when the order of individual steps or arrangement of elements is explicitly described.

This disclosure provides table assemblies and associated elements thereof for passenger seats. While the table assemblies are discussed for use with aircraft seats, they are by no means so limited. Rather, embodiments of the table assemblies may be used in passenger seats or other seats of any type or otherwise as desired. For example, embodiments may be used on trains, buses, movie theaters, student seating, or any other instance when a tray table on a forward structure may be useful.

In various embodiments, the tray table assemblies may include elements that form at least part of a core or other interior portion of a body of a tray table. These core or interior components may be constructed in a manner that reduces a weight, a complexity, and/or a number of parts used in the tray table assembly in comparison to other tray table assemblies. Resulting cost savings (e.g., in production, installation, maintenance, etc.) and/or other benefits may thus be realized by use of tray table assemblies described herein.

In some embodiments, the core of the tray table includes multiple pieces that can be connected together in different configurations to provide different widths of the core of the tray table. This may allow multiple widths of a core of the tray table to be alternatively provided without changing a total amount of material used to form the core and without changing a total weight of the core. Thus, for example, if the pieces of the core are combined in a first width and a greater width is desired, the pieces of the core can be repositioned to increase the width of the core without increasing the weight of the core.

In some embodiments, a slider assembly can be provided for use within the body of the tray table. The slider assembly may include a shaft received between bearing surfaces to facilitate movement along the shaft, for example, to permit the body of the tray table to slide toward or away from the passenger when the tray table is deployed. The bearing surfaces can be formed by inwardly curving surfaces that face one another. The inwardly curving surfaces may be located, for example, on a pair of projections extending from a base of the slider assembly. In various aspects, the projections may be integrally formed with the base. Such integral formation may reduce a number of parts used in the slider assembly and result in corresponding cost and/or weight savings. For example, such a construction may render ball bearings or other numerous or expensive parts unnecessary for the proper function of the slider assembly.

In some aspects, the base or other feature of the slider assembly may be integrally formed in a portion of a piece of the core that can be attached with another piece of the core in different configurations to provide different widths. Such a construction may allow a core to be assembled from a small number of parts, which may reduce a number of tools needed to make parts for the core or interior of the tray table, reduce a number of types of parts to maintain in inventory, and/or other benefits.

Figure 2:
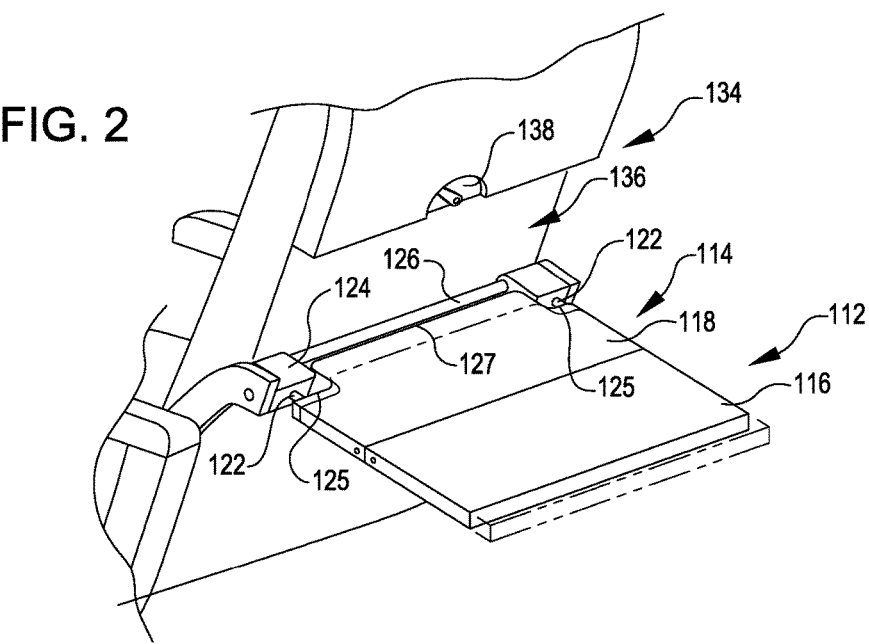
FIG. 2 is a perspective rear view of the seat of FIG. 1 with the tray table in a deployed configuration.

According to certain embodiments of the present disclosure, as shown in at least FIGS. 1-2, a seat 100 may be provided with a tray table assembly 112. Generally, FIGS. 1 and 2 are perspective views showing the tray table assembly 112 in a stowed configuration (FIG. 1) and a deployed configuration (FIG. 2), and FIGS. 3-10 are various views showing elements that may be used in the tray table assembly 112 in greater detail. The illustrated seat 100 includes a seat back 102, a seat pan 104, spreaders 130, armrests 131, and a shroud 110. The illustrated tray table assembly 112 includes a table body 114, and arms 128.

With reference to FIG. 1, the seat back 102 and seat pan 104 form the primary surfaces for supporting a passenger in the seat 100. The seat pan 104 may be oriented substantially horizontally, for example, to provide a suitable surface for receiving the thighs and buttocks of a seated passenger. The seat back 102 may be oriented substantially vertically, for example, to provide a suitable surface for receiving a back, neck, and head of a seated passenger. The seat back 102 may recline in various embodiments, for example, to allow different options for supporting passengers in seated, prone, or other positions.

The seat back 102 has a front 106 and a rear 108. In various embodiments, the seat pan 104 and the front 106 of the seat back 102 include non-rigid or pliable materials (e.g., fabric, textiles, foam, or other cushioning material) for the comfort of passengers when supported in the seat 100. Other more rigid materials may also be included, such as to reinforce pliable materials, or to provide components for other functions. For example, the shroud 110 may correspond to a component that is formed from rigid material and that is coupled with cushioning material of the seat back 102. Suitable examples of rigid material that may be used for the shroud 110 and/or other components described herein include, but are not limited to, aluminum, stainless steel, aramid fibers, polycarbonate, polypropylene, other metallic materials, composite materials, or other similar materials.

The spreaders 130 may support the armrests 131 relative to the seat 100. The armrests 131 may provide structure for supporting arms of a passenger when supported by the seat 100. In various embodiments, the spreaders 130 and/or armrests 131 provide a physical lateral boundary for the seat 100, for example, providing a physical distinction between multiple seats 100 positioned laterally adjacent one another, such as in rows in an aircraft. Multiple seats 100 may also be arranged fore or aft of one another, e.g., such that a passenger supported by the front 106 of one seat back 102 may face the rear 108 of another seat back 102.

The rear 108 of the seat back 102 may include features accessible to a passenger facing the rear 108 of the seat back 102. For example, the shroud 110 (or seat back 102) may include a screen, telephone, or other form of interface 111 for communication, entertainment, etc. Additionally or alternatively, the rear 108 of the seat back 102 may include a tray table assembly 112, such as to provide a table body 114 that can function as a flat surface for a passenger when desired (e.g., FIG. 2).

The illustrated table body 114 may be formed from a first leaf 116 and a second leaf 118. As best seen in FIG. 2, the first leaf 116 and second leaf 118 are illustrated as generally rectangular in shape, although other geometries may be used as well. The first leaf 116 and the second leaf 118 fit together when deployed to form a substantially continuous surface, such as within a substantially rectangular or square profile of the table body 114.

The arms 128 can support the table body 114 relative to the seat 100. For example, in the illustrated embodiment (e.g., FIG. 1), each arm is 128 coupled with the seat 100 between the spreader 130 and the seat back 102. In various embodiments, the arms 128 can pivot and at least partially adjust a position of the table body 114. In the illustrated embodiment, the arms 128 support the table body 114 via a stiffener rod 126, pivot blocks 124, and guide shafts 122. The stiffener rod 126 can extend laterally between the arms 128. The pivot blocks 124 can rotate relative to the arms 128, e.g., about the stiffener rod 126. The guide shafts 122 can extend from the pivot blocks 124 to the table body 114, such as into the second leaf 118. The guide shafts 122 may facilitate movement of the table body 114 when deployed toward or away from the seat back 108, such as between the positions shown in FIG. 2 in solid lines and phantom lines.

In various embodiments, a rectangular profile of a part of the table body 114 (e.g., the second leaf 118) can have corners or other edges that are contoured to match the pivot blocks 124. For example, in the embodiment depicted in the drawings (e.g., FIG. 1), the second leaf 118 has jogging, notched, or stair-stepping corners 125 along a bottom surface 127 that can allow the bottom surface 127 to be positioned at least partially between the pivot blocks 124, such as in response to movement along the guide shafts 122.

The seat back 102 may have a tray table receiving portion 134. The tray table receiving portion 134 may have a receiving surface 136 and a securement mechanism 138, such as a latch. In various embodiments, the securement mechanism 138 may be formed in the shroud 110.

Figure 3:
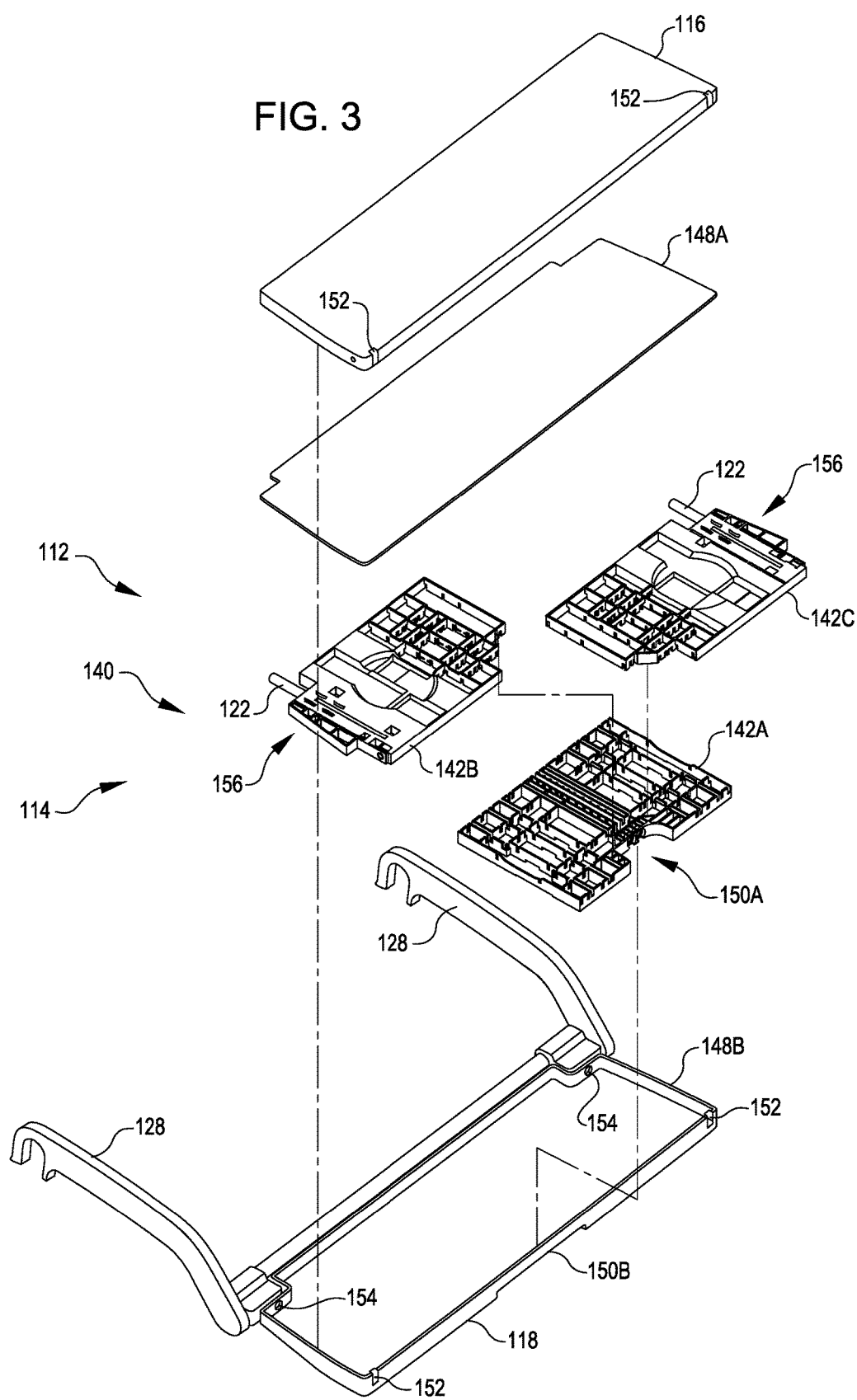
FIG. 3 is an exploded assembly view of the tray table assembly of the seat of FIGS. 1-2, showing components of a core of one leaf of the tray table assembly.

Turning to FIG. 3, the table body 114 can include a core 140. The core 140 is formed by multiple frames 142. For example, in FIG. 3, a first frame 142A forms a central portion of the core 140, a second frame 142B forms a leftward portion of the core 140, and a third frame 142C forms a rightward portion of the core 140. As described in greater detail below, the second frame 142B and/or the third frame 142C can attach to the first frame 142A in different arrangements or modes to provide different widths of the core 140.

The core 140 can be received within a shell 148 (shown in FIG. 3 as formed by a top shell portion 148A and a bottom shell portion 148B) of the table body 114. In some embodiments, the core 140 (e.g., upon interconnection of the frames 142 to provide a desired width) can be glued or otherwise anchored relative to the shell 148. The shell 148 can be formed of vacuum-formed plastic, sheet metal, or any other suitable rigid material. In various aspects, the shell 148 forms a solid outer boundary of the table body 114, such as the outer solid boundary of the second leaf 118. In some aspects, the shell 148 may correspond to a predetermined size of a table body 114. For example, different versions of the shell 148 may be provided with different widths, depending on the desired size of table body 114 for a particular passenger seat 100.

The core 140 may provide support between different portions of the shell 148. For example, the core 140 may be made of injection molded plastic or any other suitable material. In various cases, providing a core 140 that is formed of injection-molded parts (e.g., that may be snapped together) may be more cost-effective, weigh less, and/or be easier to assemble than providing a core 140 that is formed with other material (such as metal or foam) and/or assembled with rivets or other separate suitable fasteners, which may include but are not limited to screws, bolts, rivets or other mechanical or chemical fasteners. Geometry of the core 140 may depend on geometry of the shell 148 or the table body 114. For example, as shown in FIG. 3 an indentation 150A in the first frame 142A may be shaped to correspond to an indentation 150B (e.g., to receive the securement mechanism 138) in the bottom shell portion 148B.

Although the core 140 is shown with three frames 142A, 142B, and 142C, a different number of frames 142, including, but not limited to, two, three, or more than three frames 142 may be used to provide a core 140. In some aspects, including three or more frames 142 may be useful if a feature of the core 140 is to be positioned in a certain location regardless of the width of the table body 114. As an illustrative example, during construction of the table body 114, the indentation 150A in the first frame 142A may be aligned centrally relative to the table body 114 (e.g., to align with the indentation 150B in the bottom shell portion 148B), and the second frame 142B and third frame 142C may be connected with the first frame 142A at appropriate lateral positions to form a particular width of the core 140, such as to match the width of the shell 148.

For ease of viewing, FIG. 3 is illustrated with only a core 140 for the second leaf 118 of the table body 114. However, a similar or different core 140 may additionally or alternatively be provided in the first leaf 116. As an illustrative example, a core 140 for the first leaf 116 may include just two frames 142 therein. This may be a suitable arrangement for the illustrated first leaf 116 due to a lack of a particularly aligned feature such as the indentation 150B for the securement mechanism 138. However, the first leaf 116 may alternatively include a core 140 with any other number of frames 142, including one, two, or more than two. Additionally, the first leaf 116 and the second leaf 118 of the table body 114 need not necessarily both include cores 140 with multiple frames 142 or include cores 140 having the same number of frames. Furthermore, although the table body 114 is illustrated with two leaves 116 and 118, in some embodiments, cores 140 described herein may instead be used with table bodies 114 having a single leaf or more than two leaves.

The table body 114 may also include other features for facilitating operation of the table body 114. For example, the first leaf 116 and for the second leaf 118 (e.g., in the shell 148) may include notches 152 to facilitate placement of hinges to allow the first leaf 116 and the second leaf 118 to shift between folded and unfolded configurations of the table body 114. Additionally the shell 148 may include passages 154 through the shell 148 (e.g., connecting the exterior and interior of the table body 114) and through which the guide shafts 122 (e.g., FIG. 2) can extend.

As noted above, the guide shafts 122 can facilitate movement of the table body 114 relative to other components such as the arms 128 and/or the seat back 108. As examples, a guide shaft 122 may be part of a sliding assembly 156 integrally formed in a frame 142 (as shown in FIG. 3) or in a sliding assembly 256 formed independently from the frames 142 (as shown in FIGS. 8-10). In various embodiments, providing an integrally formed sliding assembly 156 can reduce a number of parts that may otherwise be used in installation or maintained in inventory. For example, providing integrally formed sliding assemblies 156 in the frames 142 may allow an installer to assemble the three frames 142A, 142B, and 142C together into an assembled core 140, align guide shafts 122 through the bottom shell portion 148B, secure the assembled core 140 to the bottom shell portion 148B, and secure the top shell portion 148A to complete the table body 114 without also handling rivets, bearings, or other hardware for assembling and/or securing the sliding assembly 156 relative to the other components of the table body 114.

Figure 4:
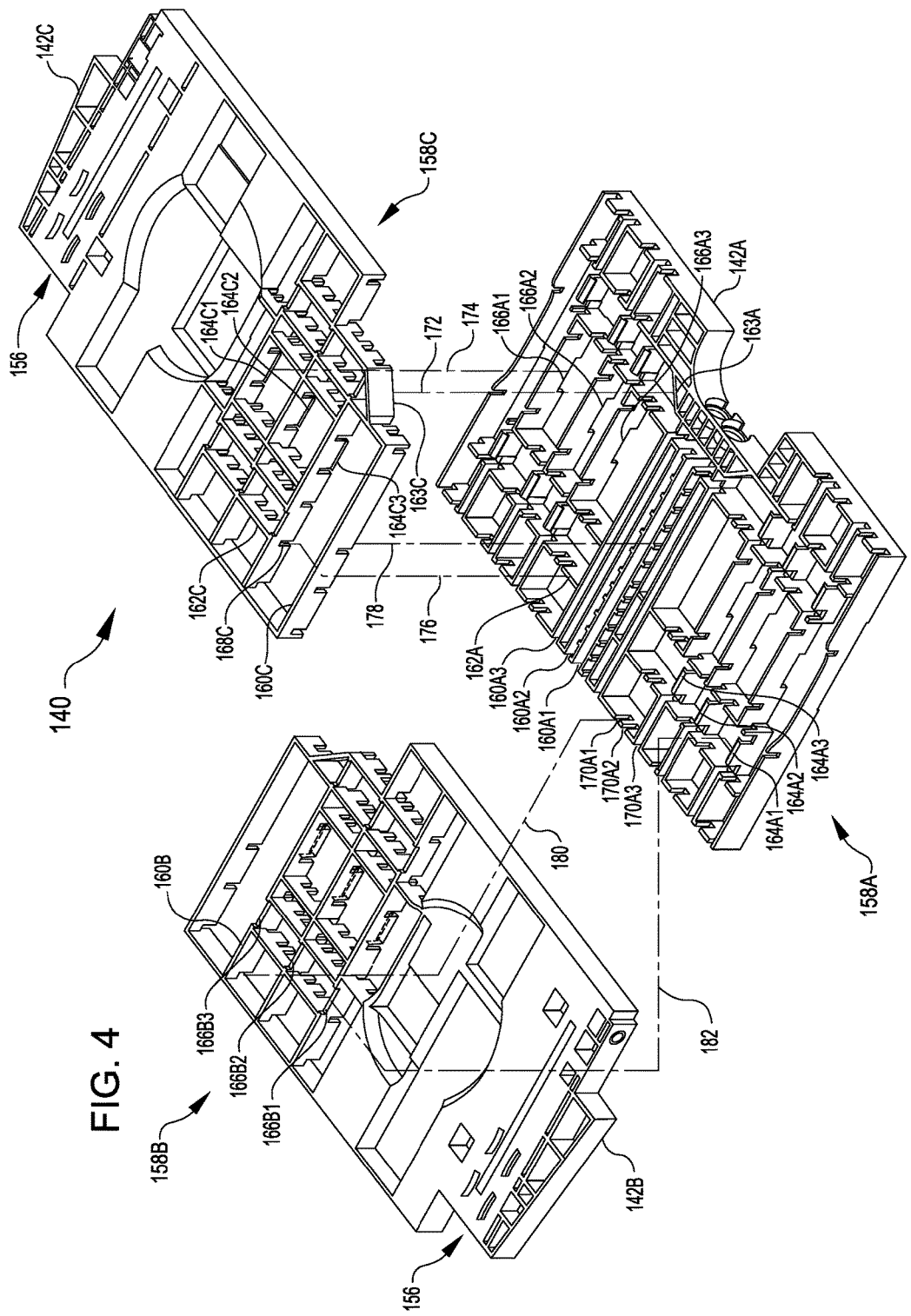
FIG. 4 is an exploded assembly view, showing greater detail of the components of the core of the tray table assembly of the seat of FIGS. 1-3.
Figure 5:
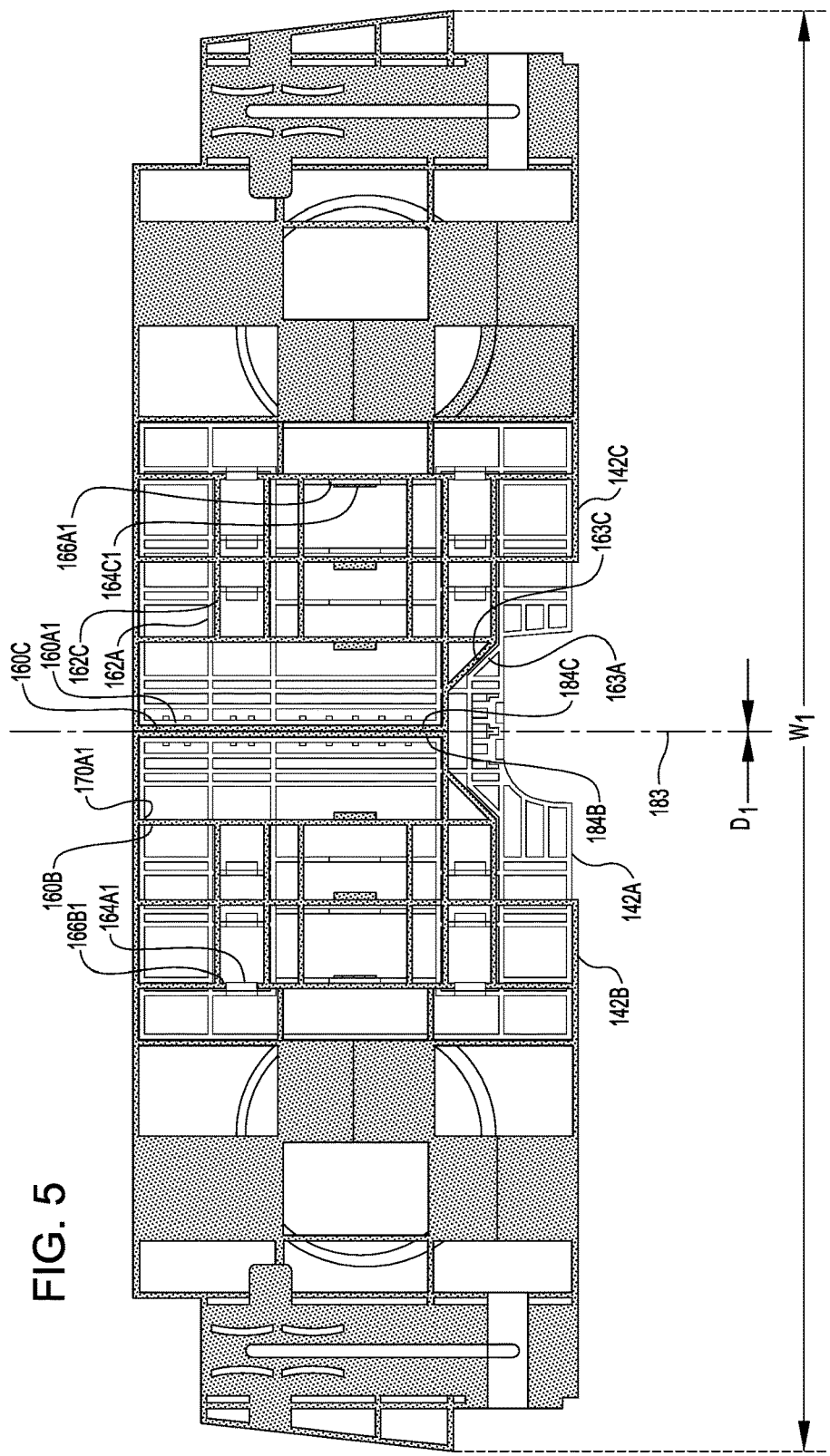
FIG. 5 is a top view of the components of the core of FIG. 4, showing the components of the core assembled to provide a first, compact combined width.
Figure 6:
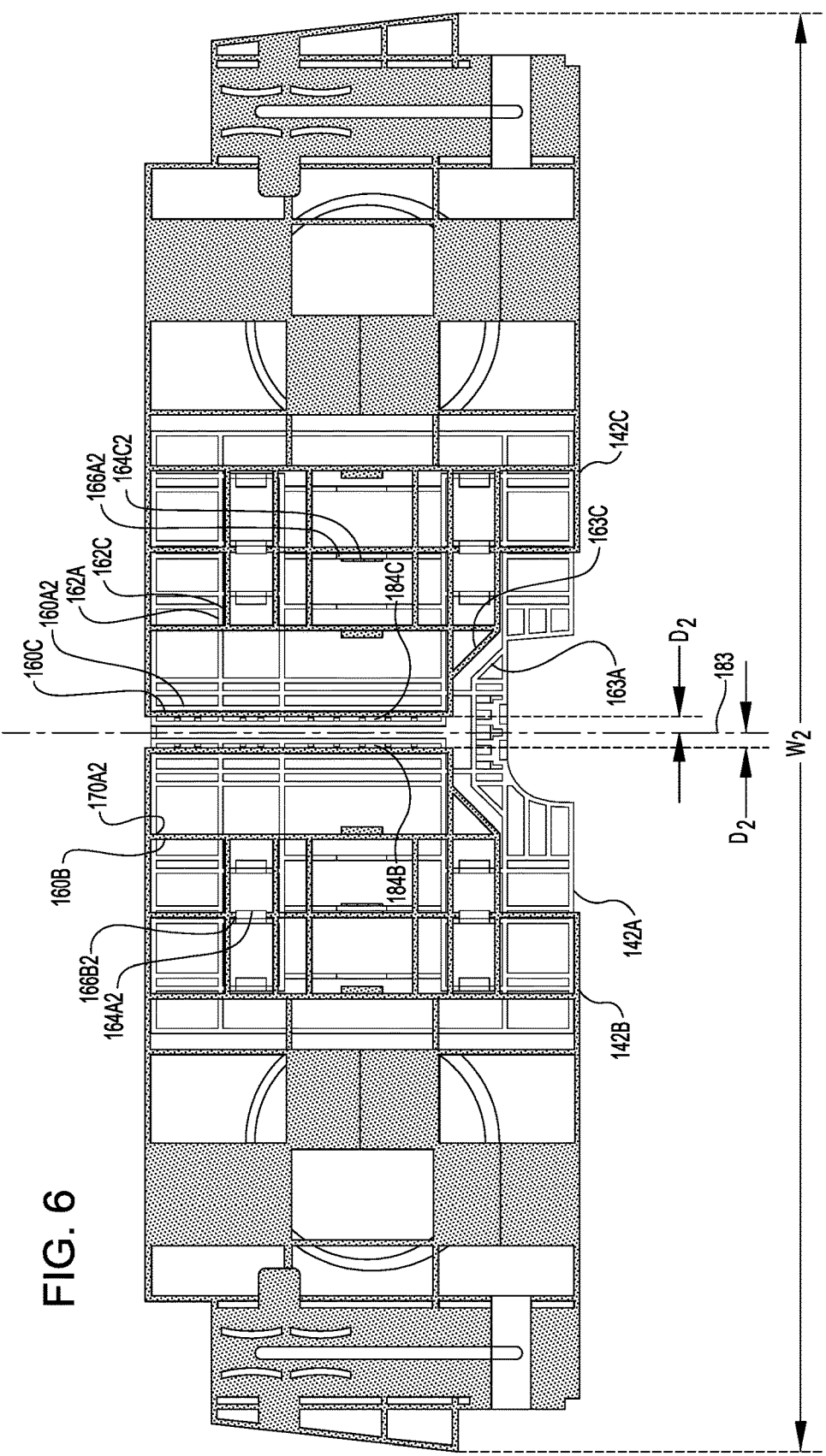
FIG. 6 is a top view of the components of the core of FIG. 4-5, showing the components of the core assembled to provide a second, medium combined width.
Figure 7:
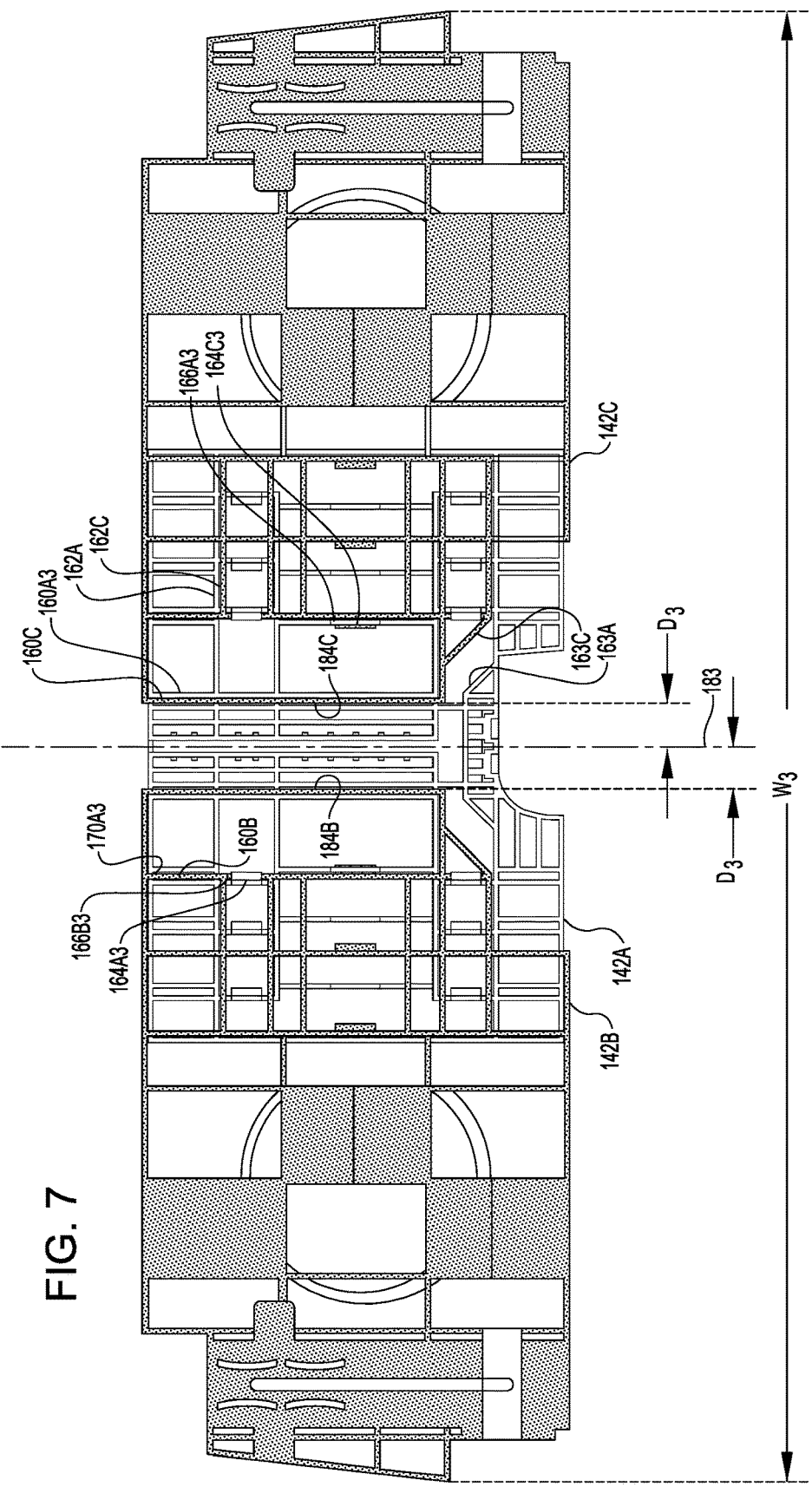
FIG. 7 is a top view of the components of the core of FIG. 4-6, showing the components of the core assembled to provide a third, extended combined width.

The example frames 142 of the core 140 are shown in greater detail in FIG. 4. Engagement features 158 distributed among the frames 142 of the core 140 can allow the frames 142 to connect with one another in different modes for forming different widths of the core 140. For example, in FIG. 4, the first frame 142A (e.g., the central frame 142A) includes a first set of engagement features 158A, the second frame 142B (e.g., the leftward frame 142B) includes a second set of engagement features 158B, and the third frame 142C (e.g., the rightward frame 142C) includes a third set of engagement features 158C. The second set of engagement features 158B and the third set of engagement features 158C can engage the first set of engagement features 158A at different positions along the central frame 142A to vary a width of the core 140. For example, the engagement features 158 shown on the frames 142 in FIG. 4 can allow the frames 142 to be connected to one another in at least three different modes to provide at least three different widths of the core 140. Three examples of such modes and corresponding different widths are shown in FIGS. 5 to 7 and described in greater detail below.

The engagement features 158 shown in FIG. 4 include "vertical" braces 160, "horizontal" braces 162, "slanted" braces 163, clasps 164, indentations 166, "horizontal" notches 168, and "vertical" notches 170. These features are identified with suffixes relating to the frames 142 on which they are located. Although these specific examples are shown in FIG. 4, other types, forms, numbers, and/or combinations of engagement features 158 may additionally or alternatively be utilized.

Generally, in the embodiment shown in FIG. 4, the vertical braces 160 are oriented in a depth direction from a front to a back of the core 140, while the horizontal braces

162 are oriented transverse thereto, e.g., along a width direction of the core 140. The slanted braces 163 are oriented in a direction that is different from either vertical braces 160 or the horizontal braces 162. The vertical braces 160, the horizontal braces 162, and the slanted braces 163 can have thicknesses situated in a thickness direction of the core 140. The horizontal notches 168 can be formed extending transversely through the vertical braces 160 (e.g., for receiving horizontal braces 162 on another frame 142). Similarly, the vertical notches 170 can be formed extending transversely through the horizontal braces 162 (e.g., for receiving vertical braces 160 on another frame 142). In some cases, horizontal notches 168 may receive vertical notches 170 or vice versa. Clasps 164 may be formed to engage features (such as indentations 166) on another frame 142. As an illustrative example, a particular clasp 164C1 may be formed with a flexibly resilient projection extending in the thickness direction and having a transversely extending flange that can flex around a portion of another frame 142A, e.g., so as to seat in a particular indentation 166A1 formed in a vertical brace on the other frame 142A.

In the embodiment shown in FIG. 4, various of the engagement surfaces 158 may be organized into groups of three, e.g., corresponding to three different modes of engagement that can provide the three different widths $W_1$, $W_2$, and $W_3$ shown in FIGS. 5-7. As an illustrative example, the three different modes of engagement may result in respective alternative core widths of $W_1=40.4$ cm, $W_2=41.3$ cm, and $W_3=42.8$ cm, although different widths and/or numbers of widths could be provided. Different matching pairs from corresponding groups of three features may engage with one another depending on the mode of engagement. For example, a right side of the central frame 142A depicted in FIG. 4 includes three indentations 166A1, 166A2, and 166A3 that may respectively match three clasps 164C1, 164C2, and 164C3 on the rightward frame 142C for individual respective engagement based on the mode. More specifically, the first clasp 164C1 may engage a first indentation 166A1 in the first mode (e.g., FIG. 5), whereas the second clasp 164C2 may engage a second indentation 166A2 in the second mode (e.g., FIG. 6), and the third clasp 164C3 may engage a third indentation 166A3 in the third mode (e.g., FIG. 7). Thus, different individual engagement features 158 in particular groups may be engaged to connect the frames 142 together in different modes, e.g., to provide different total widths of the core 140.

FIG. 5 shows the frames 142 connected and held together in a first mode to provide a first width $W_1$ of the core 140 (e.g., a narrowest width of the three alternative widths $W_1$, $W_2$, and $W_3$ shown in FIGS. 5-7). Reference lines 172, 174, 176, 178, 180, and 182 shown in FIG. 4 indicate how engagement features 158 of the frames 142 have been aligned (e.g., in the thickness direction) and connected together to provide the mode shown in FIG. 5.

For example, along line 172 (FIG. 4), the slanted brace 163C on the rightward frame 142C is installed so as to abut the slanted brace 163A on the central frame 142A, thus arriving at the relative positions shown in FIG. 5. Additionally, along line 174 (FIG. 4), a first clasp 164C1 on the rightward frame 142C is installed to engage a corresponding indentation 166A1 on the central frame 142A. Along line 176 (FIG. 4), a horizontal notch 168C on the rightward frame 142C is brought to engage a horizontal brace 162A on the central frame 142A. Along line 178 (FIG. 4), a vertical brace 160C on the rightward frame 142C is brought into a position with an inner face abutting and/or facing a first vertical brace 160A1 on the central frame 142A. Along line 180 (FIG. 4), a vertical brace 160B on the leftward frame 142B is brought into alignment and engagement with a first vertical notch 170A1 in the central frame 142A. Along line 182 (FIG. 4), a first indentation 166B1 on the leftward frame 142B is brought into alignment and engagement with a first clasp 164A1 on the central frame 142A.

The frames 142 can also be connected such that the lateral frames (e.g., the leftward frame 142B and the rightward frame 142C) have inner ends 184B and 184C that are positioned different distances apart from a reference feature in different modes. For example, the frames 142 are connected in the first mode in FIG. 5 such that the inner ends 184B and 184C of the lateral frames 142B and 142C abut one another, corresponding to the lateral frames 142B and 142C each being a negligible first distance $D_1$ apart from one another and from a centerline 183 (or other reference feature) of the central frame 142A.

If a different width of the core 140 is desired in lieu of the width $W_1$ shown in FIG. 5 (e.g., for installation in a table body 114 having a shell 148 with a larger width), the engagement features 158 can be connected in a different mode. For example, FIG. 6 shows the frames 142 combined in a different, second mode to provide a different, second width $W_2$ of the core 140 (e.g., a medium width of the three alternative widths $W_1$, $W_2$, and $W_3$ shown in FIGS. 5-7).

In the second mode shown in FIG. 6, the engagement features 158 identified in FIG. 4 are engaging one another in a different way or in other combinations than in the first mode shown in FIG. 5. For example, instead of a first clasp 164C1 on the rightward frame 142C engaging a first indentation 166A1 on the central frame 142A (as along line 174 in FIG. 5), in FIG. 6, a second clasp 164C2 on the rightward frame 142C engages a second indentation 166A2 on the central frame 142A. Additionally, the slanted braces 163A and 163C are spaced further apart from one another in the second mode in FIG. 6 than in the first mode in FIG. 5. The inner face of the vertical brace 160C on the rightward frame 142C in FIG. 6 abuts and/or faces a different, second vertical brace 160A2 on the central frame 142A, rather than the first vertical brace 160A1 from FIG. 5. The horizontal brace 162A of the central frame 142A in FIG. 6 also abuts the horizontal brace 162C of the rightward frame 142C as in FIG. 5, although different notches are used to engage vertical braces 160 that run transversely to those horizontal braces 162A and 162C. The vertical brace 160B on the leftward frame 142B in FIG. 6 is brought into alignment and engagement with a second vertical notch 170A2 in the central frame 142A, rather than with the first vertical notch 170A1 from FIG. 5. Additionally, a second indentation 166B2 on the leftward frame 142B is brought into alignment and engagement with a second clasp 164A2 on the central frame 142A instead of accomplishing the corresponding engagement in FIG. 5 of the first indentation 166B1 on the leftward frame 142B with the first clasp 164A1 on the central frame 142A. Moreover, the connections in the second mode of FIG. 6 cause the inner ends 184B and 184C of the lateral frames 142B and 142C to be spaced apart from the centerline 183 a different, larger distance $D_2$ than the distance $D_1$ resulting from the first mode of FIG. 5.

FIG. 7 shows the frames 142 combined in a third mode to provide a different, third width $W_3$ of the core 140 (e.g., a largest width of the three alternative widths $W_1$, $W_2$, and $W_3$ shown in FIGS. 5-7). In the third mode shown in FIG. 7, the engagement features 158 identified in FIG. 4 are engaging one another in a different way or in other combinations than in the first and second modes respectively shown in FIGS. 5 and 6. In FIG. 7, on the rightward frame 142C, a third clasp 164C3 (positioned further to the left than the first clasp 164C1 or the second clasp 164C2 shown in FIG. 4) engages a third indentation 166A3 on the central frame 142A (positioned further to the left than the first indentation 166A1 or the second indentation 166A2 shown in FIG. 4). Additionally, the slanted braces 163A and 163C are spaced further apart from one another in the third mode in FIG. 7 than in either of the first and second modes of FIGS. 5 and 6. The inner face of the vertical brace 160C on the rightward frame 142C in FIG. 7 abuts and/or faces a third vertical brace 160A3 on the central frame 142A. The horizontal brace 162A of the central frame 142A in FIG. 7 also abuts the horizontal brace 162C of the rightward frame 142C as in FIGS. 5 and 6. The vertical brace 160B on the leftward frame 142B in FIG. 6 is brought into alignment and engagement with a third vertical notch 170A3 in the central frame 142A. Additionally, a third indentation 166B3 on the leftward frame 142B (positioned further to the right than the first indentation 166B1 or the second indentation 166B2 shown in FIG. 4) is brought into alignment and engagement with a third clasp 164A3 on the central frame 142A (also positioned further to the right than the first clasp 164A1 or the second clasp 164A2 shown in FIG. 4). Moreover, the connections in the third mode of FIG. 7 cause the inner ends 184B and 184C of the lateral frames 142B and 142C to be spaced apart from the centerline 183 a different, larger distance $D_3$ than either of the distances $D_1$ or $D_2$ from the first or second modes.

As may be appreciated from the foregoing description, in some instances in the three described modes of engagement, a particular engagement feature 158 may be positioned so as to engage a different engagement feature 158 in each of the modes. For example, the inner face of the vertical brace 160C on the rightward frame 142C faces or abuts a different vertical brace 160A1, 160A2, or 160A3 on the central frame 142A in each of the three depicted modes. Additionally, in some instances of the three described modes, a particular engagement feature 158 may be positioned so as to only engage another particular engagement feature 158 in one of the modes. For example, the second clasp 164A2 on the central frame 142A is arranged so as to only engage in the second mode, engaging with the second indentation 166B2 on the leftward frame 142B. However, embodiments herein are not limited to the exact modes just described and may additionally or alternatively include any combination of engagement features 158 that may be configured to selectively engage only a single other engagement feature 158 depending on the mode or engage any of multiple engagement features 158 depending on the mode. For any given engagement feature 158, a set of engagement features 158 of another frame 142 may include any suitable number (including one, two, three, or more) of matching engagement features 158 for the particular feature 158. Indeed, although the frames 142 in the drawings are an example of a core 140 that is reconfigurable among at least three modes to provide at least three widths, frames 142 may additionally or alternatively be produced that are capable of combination in more or fewer modes than three, such as to provide more or fewer than three widths of the core 140.

FIGS. 8-10 show a sliding assembly 256 that may be utilized within the table body 114. The sliding assembly 256 includes a base 230 and a guide shaft 222. The guide shaft 222 is an example of the guide shaft 122 described above with respect to FIGS. 1 and 2. The guide shaft 222 can slide relative to the base 230, for example, to facilitate movement of the table body 114 relative to the seat back 108 described with respect to FIG. 2.

The base 230 shown in FIG. 8 is illustrated as a piece that is formed independently of the frames 142 of FIGS. 3-7. For example, the base 230 in FIG. 8 is shown with fastening interfaces 238 that may be utilized to fasten the base 230 with the frames 142 or other interior component of the table body 114. The fastening interfaces 238 can correspond to loops, hooks, or any appropriate structure for facilitating attachment of fasteners for connecting the base 230 to another structure for installation. Any form of fasteners, which include but are not limited to screws, bolts, rivets or other mechanical or chemical fasteners may be used.

In some embodiments, the base 230 and/or associated components of the sliding assembly 256 may additionally or alternatively be integrally formed into any of the frames 142. Hence, although various elements are described herein with respect to a sliding assembly 256 (e.g., FIGS. 8-10) that is formed independently from any of the frames 142, the same or different elements may additionally or alternatively be present in any sliding assembly 156 (e.g., FIGS. 3-7) that includes components integrally formed into any of the frames 142.

The base 230 may form part of a housing 255 of the sliding assembly 256. The housing 255 may include any suitable combination of components to retain the guide shaft 222 within a suitable volume. For example, the housing 255 may include sidewalls 232 and a cover 234. In the embodiment shown in FIG. 8, the cover 234 is configured to be joined with the sidewalls 232 via coupling features 236A and 236B located respectively on the sidewalls 232 and the cover 234. Although the coupling features 236A and 236B are illustrated as prongs and apertures respectively, any other suitable coupling features 236 can be used.

The guide shaft 222 can be coupled with a stopper 242 that is received in a slot 240. The slot 240 can be located in the base 230 or any suitable portion of the housing 255 for constraining the guide shaft 222 from moving beyond a predetermined amount defined by the slot 240. For example, the stopper 242 can prevent the guide shaft 222 from retracting into the housing 255 beyond a certain point due to interfering engagement of the stopper 24 with an inward end of the slot 240 (e.g., FIG. 9) or prevent the guide shaft 222 from extending out of the housing 255 beyond a certain point due to interfering engagement of the stopper with an outward end of the slot 240 (e.g., FIG. 10).

Projections 244 may provide bearing surfaces for the guide shaft 222. In some embodiments, providing bearing surfaces through the projections 244 may be more lightweight, cost-effective, and/or less labor intensive for installation than alternative sliding assemblies that utilize ball bearings to facilitate motion. Suitable materials for the projections 244 may include nylon (with or without a glass fill), acetal homopolymer (e.g., as commercially available under the trade name Delrin), and/or other materials that exhibit favorable durability and/or lubricity characteristics.

The projections 244 can extend from the base 230. The projections 244 can be organized in pairs, such as in a first pair 245 including a first projection 244A and a second projection 244B; a second pair 247 including a third projection 244C and a fourth projection 244D; etc. The first pair 245 and the second pair 247 can be aligned with one another so that the guide shaft 222 can be received between multiple (e.g., both depicted) pairs 245 and 247 of the projections 244 when the guide shaft 222 is fully extended and/or retracted.

Each projection 244 may be similar to any of the other projections 244. Accordingly, any of the projections 244 may also include similar features as those described herein for the first projection 244A and/or the second projection 244B.

The first projection 244A may be curved toward the other projection 244B in the first pair 245. Due to this curvature, the first projection 244A may have an inner surface 250 corresponding to a location on the first projection 244A that is nearest to the other projection 244B of the first pair 245. The guide shaft 222 may be received along this inner surface 250. The first projection 244A may be resiliently flexible (e.g., function as springs) so as to press against sides of the guide shaft 222 when the guide shaft 222 is received between the first pair 245 of projections 244A and 244B. For example the guide shaft 222 may be sized so as to be slightly larger than a distance between inner surfaces 250 of the projections 244 in the first pair 245A of projections 244. This may result in the projections 244 being deflected and placed in tension to press against the guide shaft 222. The pair 245 of projections 244A and 244B may press against the guide shaft 222 and account for any variations in tolerance of dimensions of the guide shaft 222. The projections 244 pressing against the guide shaft 222 may also provide sufficient friction against the guide shaft 222 to prevent inadvertent movement of the guide shaft 222 (e.g., due to gravity), yet permit movement of the guide shaft 222 when desired (e.g., when a passenger pushes against the table body 114).

The first projection 244A may include a gap 246 between the inner surface 250 and the base 230. Such a gap may facilitate flexibility of the projections 244 in the sliding assembly 256. In some embodiments the gap 246 is positioned over an opening 248 in the base 230. For example, such an opening 248 may facilitate ease of manufacturing in processes (such as injection molding or other methods) that may be used for forming the base 230 or other elements of the sliding assembly 256. This may result in an inner surface 250 of the projections 244 being positioned and suspended between uprights 252 that extend from the base 230 and form a transition between the inner surface 250 and the base 230.

Different arrangements of the components depicted in the drawings or described above, as well as components and steps not shown or described are possible. Similarly, some features and sub-combinations are useful and may be employed without reference to other features and sub-combinations. Embodiments of the disclosure have been described for illustrative and not restrictive purposes, and alternative embodiments will become apparent to readers of this patent. Accordingly, the present invention is not limited to the embodiments described above or depicted in the drawings, and various embodiments and modifications may be made without departing from the scope of the claims below.

That which is claimed is:

1. An assembly comprising:
a first frame defining a central component of a core of a tray table and comprising a first set of engagement features integrally formed in the first frame, wherein the first set of engagement features comprise one or more braces, clasps, indentations, or notches;
a second frame defining a leftward component of the core of the tray table and comprising a plurality of second sets of engagement features integrally formed in the second frame in a plurality of locations, wherein each second set of engagement features comprise one or more braces, clasps, indentations, or notches that are designed to match with at least a portion of the first set of engagement features; and
a third frame defining a rightward component of the core of the tray table and comprising a plurality of third sets of engagement features integrally formed in the third frame in a plurality of locations, wherein each third set of engagement features comprise one or more braces, clasps, indentations, or notches that are designed to match with at least a portion of the first set of engagement features;
wherein the first set of engagement features is interlocked with one of the plurality of second sets of engagement features and one of the plurality of third sets of engagement features so that the first frame, the second frame, and the third frame connect together to form the core of the tray table;
wherein a width of the core of the tray table is at least partially determined by the location of the second set of engagement features and the location of the third set of engagement features that are interlocked with the first set of engagement features; and
wherein the second frame and the third frame each comprise a respective frame comprising a sliding assembly comprising:
a base integrally formed in the respective frame; and
a pair of projections extending from the base and curved toward one another to provide bearing surfaces for a shaft that is positioned between the pair of projections so as to facilitate sliding of the core of the tray table relative to the shaft.

2. The assembly of claim 1, further comprising a shell corresponding to the width of the core of the tray table and disposed about the core of the tray table.

3. The assembly of claim 1, further comprising a seat comprising a seat back, wherein the sliding assembly facilitates sliding of the core of the tray table relative to the seat back.

4. The assembly of claim 1, wherein the core of the tray table comprises a core of a first leaf of the tray table, wherein the assembly comprises a second leaf of the tray table coupled with the first leaf of the tray table by one or more hinges.

5. An assembly comprising:
a first frame defining a first component of a core of a tray table and comprising a first set of engagement features; and
a second frame defining a second component of the core of the tray table and comprising a plurality of second sets of engagement features positioned in a plurality of locations, wherein each second set of engagement features comprise one or more braces, clasps, indentations, or notches that are designed to match with at least a portion of the first set of engagement features;
wherein the first set of engagement features are interlocked with one of the plurality of second sets of engagement features so that at least the first frame and the second frame connect together to form the core of the tray table; and
wherein a width of the core of the tray table is at least partially determined by the location of the second set of engagement features that are interlocked with the first set of engagement features.

6. The assembly of claim 5, further comprising a third frame defining a third component of the core of the tray table and comprising a plurality of third sets of engagement features positioned in a plurality of locations, wherein each third set of engagement features comprise one or more braces, clasps, indentations, or notches that are designed to match with at least a portion of the first set of engagement features;

wherein the first set of engagement features is further interlocked with one of the plurality of third sets of engagement features so that at least the first frame, the second frame, and the third frame connect together to form the core of the tray table; and wherein a width of the core of the tray table is at least partially determined by the location of the third set of engagement features that are interlocked with the first set of engagement features.

7. The assembly of claim 5, wherein the plurality of second sets of engagement features are positioned in three locations on the second frame, thereby providing at least three alternative widths of the core of the tray table.

8. The assembly of claim 5, wherein the tray table comprises a first leaf and a second leaf, the second leaf being disposed between the first leaf and a back of a passenger seat when the tray table is in a stowed position, wherein the core of the tray table is disposed in the first leaf.

9. The assembly of claim 5, wherein the tray table comprises a first leaf and a second leaf, the second leaf being disposed between the first leaf and a back of a passenger seat when the tray table is in a stowed position, wherein the core of the tray table is disposed in the second leaf.

10. The assembly of claim 5, wherein the first set of engagement features interlocked with one of the plurality of second sets of engagement features comprises a clasp interlocked with a brace.

11. The assembly of claim 5, wherein the first set of engagement features interlocked with one of the plurality of second sets of engagement features comprises a notch interlocked with a brace.

12. The assembly of claim 5, further comprising a sliding assembly comprising:

a base integrally formed in the first frame; and a pair of projections extending from the base and curved toward one another to provide bearing surfaces for a shaft that is positioned between the pair of projections so as to facilitate sliding of the core of the tray table relative to the shaft.

13. An assembly configured to be coupled with or included in a body of a tray table, the assembly comprising:

a base, the base defining a longitudinal direction, a lateral direction, and a vertical direction;

a pair of projections spaced apart from one another in the lateral direction, extending from the base in the vertical direction, and each having a respective bearing surface curved toward one another in curves defined about the vertical direction; and a shaft slidably received by the respective bearing surfaces of the pair of projections so as to facilitate sliding of the body of the tray table relative to the shaft along the longitudinal direction.

14. The assembly of claim 13, wherein the pair of projections comprises a first pair of projections, wherein the assembly further comprises a second pair of projections curved toward one another; and wherein the shaft is slidably received by bearing surfaces of the first pair and the second pair of projections so as to facilitate sliding of the base relative to the shaft.

15. The assembly of claim 13, wherein an inner surface of a projection of the pair of projections nearest the other projection of the pair of projections is positioned with a gap between the inner surface and the base so as to permit flexure of the inner surface of the projection for engaging the shaft independent of deformation of the base.

16. The assembly of claim 13, further comprising:

a slot disposed through the base and between the pair of projections; and a stopper coupled with the shaft and extending into the slot so as to constrain the shaft from moving beyond a predetermined amount defined by the slot.

17. The assembly of claim 13, wherein the base is coupled with the body of the tray table by being integrally formed in a component of a core of the tray table.

18. The assembly of claim 13, wherein the base is configured to be coupled with the body of the tray table by receiving at least one fastener for coupling the base with the body of the tray table.

19. The assembly of claim 13, further comprising a housing comprising:

the base; and sidewalls extending from the base.

20. The assembly of claim 19, further comprising a lid configured to be received along the sidewalls so as to enclose at least one of the pair of projections or the shaft within the housing.

\* \* \* \* \*